United States Patent
Yamamoto et al.

(10) Patent No.: US 7,098,950 B2
(45) Date of Patent: Aug. 29, 2006

(54) IMAGE SENSOR WITH STABILIZED BLACK LEVEL AND LOW POWER CONSUMPTION

(75) Inventors: Katsuyosi Yamamoto, Kawasaki (JP); Jun Funakoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 847 days.

(21) Appl. No.: 09/785,330

(22) Filed: Feb. 20, 2001

(65) Prior Publication Data
US 2001/0028392 A1 Oct. 11, 2001

(30) Foreign Application Priority Data

Mar. 28, 2000 (JP) ............................. 2000-092967
Mar. 28, 2000 (JP) ............................. 2000-092971

(51) Int. Cl.
*H04N 9/64* (2006.01)

(52) U.S. Cl. ..................................... 348/243

(58) Field of Classification Search ................ 348/243, 348/246
See application file for complete search history.

(56) References Cited

U.S. PATENT DOCUMENTS 5,949,483 A * 9/1999 Fossum et al. ............. 348/303
6,130,712 A * 10/2000 Miyazaki et al. ........... 348/243
6,452,153 B1 * 9/2002 Lauxtermann et al. ... 250/208.1
6,627,896 B1 * 9/2003 Hashimoto et al. ..... 250/370.11
6,903,768 B1 * 6/2005 Ohsawa et al. ............. 348/241

FOREIGN PATENT DOCUMENTS

JP 4-142891 5/1992

\* cited by examiner

*Primary Examiner*—Tuan Ho
*Assistant Examiner*—Gary C. Vieaux
(74) *Attorney, Agent, or Firm*—Arent Fox PLLC

(57) ABSTRACT

The control inputs of reset switch elements 41 to 45 are commonly connected to a row reset line 51. In a line black clamp type, cathodes as reset ends of photodiodes (31) of optical black pixels 21 to 23 are commonly connected to a potential averaging line 30. In a frame black clamp type, potential averaging lines are connected similarly to respective pixel rows on the vertical scanning start side of an optical black pixel region, and the potential averaging lines may be commonly connected to each other to operate just like one pixel row. A first block includes a pixel array and a vertical scanning circuit, while a second block includes sample and hold circuits, a horizontal scanning circuit, an amplifier and an A/D converter 19. In a low power consumption mode, power supply to the second block is ceased in a light integration period of one frame with performing light integration in the pixel array, power supply to the first and second blocks is performed in a read-out period of one frame to read out integrated signals, and power supply to the first and second blocks is ceased in a power-off period of one frame.

2 Claims, 19 Drawing Sheets

IMAGE SENSOR WITH STABILIZED BLACK LEVEL AND LOW POWER CONSUMPTION

BACKGROUND OF THE INVENTION

1. Field of the Invention

The present invention relates generally to an image sensor, more particularly, to an image sensor having plurality of pixels arranged in rows and columns, for use in such an electronic camera, an image reader or a facsimile, with a stabilized black level and low power consumption.

2. Description of the Related Art

In an image sensor, each light receiving element outputs a signal having an integrated light component and an integrated dark current component. This dark current has a strong temperature dependency that the current becomes about twice with rise of 9° C.

In order to remove the integrated dark current component from the signal to obtain true integrated light signal, in the prior art, the peripheral region of a pixel array was covered with a light shielding film to form an optical black pixel region, and an integrated dark current signal was read out from the optical black pixels in a blanking period to obtain the average voltage Vd of the integrated dark current signals in a black clamp circuit as an offset value (a black clamp level). The average Vd was subtracted from each pixel signal Vs in the black clamp circuit in a period of reading out from an effective pixel region.

There are two kind of black clamps, one is a line black clamp performed in each horizontal scanning, the other is a frame black clamp performed in each frame, and one of them is adopted.

FIG. 19 shows an integrated dark current signal read out from an optical black pixel region in a horizontal blanking period. The signal is not constant according to characteristics of each pixel.

Especially, when a defective pixel exists, an integrated dark current signal suddenly changes as shown in FIG. 19, therefore an offset value becomes incorrect in a black clamp circuit having a integration capacitor for obtaining an average value, which causes lateral stripe noise. If the width of the optical black pixel region is wide in order to prevent the noise, the offset component could not be obtained in a horizontal blanking period in an image sensor having quite many pixels, or a chip area increases with the result of higher cost.

On the other hand, in an image sensor adopted in portable equipment, reduction in power consumption has been required.

There are following methods for reduction in power consumption of a semiconductor chip:

(1) to stop an operation clock in a period where no operation is required; and (2) to reduce a clock frequency by a divider, for example, to a half, a quarter and one-eighths thereof.

However, the chip of an image sensor includes an analogue circuit and a digital circuit, power consumption of the analog circuit is larger than that of the digital circuit with a large ratio, and power consumption of an image sensor for taking a moving picture cannot decrease to a great extent by such methods.

When a power source for the analog circuit is on/off controlled, the influence of off appears after one frame, therefore the power source cannot be simply turned off.

SUMMARY OF THE INVENTION

Accordingly, it is an object of the present invention to provide an image sensor capable of preventing variations in black level due to a pixel defect.

It is another object of the present invention to provide an image sensor capable of obtaining a black clamp level in a shorter time.

It is still another object of the present invention to provide an image sensor capable of decreasing power consumption by performing fine on/off control of a power source for an internal circuit in a case of a reduced frame rate.

In one aspect of the present invention, an image sensor comprises a potential averaging line commonly connected to reset nodes of a plurality of pixels in a pixel row in a optical black pixel region.

With this aspect, a potential averaging processing is automatically performed before reading out a signal from the optical black pixel region instead of performing an averaging processing in a black clamp circuit as in the prior art. Therefore, a black level (integrated dark current signal) is stabilized, more correct line black clamp is performed, and lateral stripe noise is reduced, thereby improving an image quality.

Further, since an integrated dark current signal has only to be sampled at a specific time, a configuration of a black clamp circuit can be made simpler than that in the prior art.

Furthermore, since a black clamp level (an offset value) can be obtained in a shorter time than in the prior art because of the above described reason, there is no problem even if quite many pixels exist in a pixel array and thereby a blanking period is short.

In another aspect of the present invention, there is provided an image sensor comprising a control circuit for repeating sequential operation of a light integration period, a read-out period and a power-off period, wherein the control circuit: in the light integration period, causes the pixel array to perform light integration without supplying power to the read-out circuit; in the read-out period, causes the read-out circuit to read out the integrated signals; and in the power-off period, ceases to supply power to the pixel array and the read-out circuit.

With this aspect, power supply for the read-out circuit ceases in the light integration period and besides, power supply to the pixel array and the read-out circuit ceases in the power-off period, thereby power consumption in the image sensor can be reduced.

Other aspects, objects, and the advantages of the present invention will become apparent from the following detailed description taken in connection with the accompanying drawings.

BRIEF DESCRIPTION IN THE DRAWINGS

DESCRIPTION OF THE PREFERRED EMBODIMENTS

Figure 1:
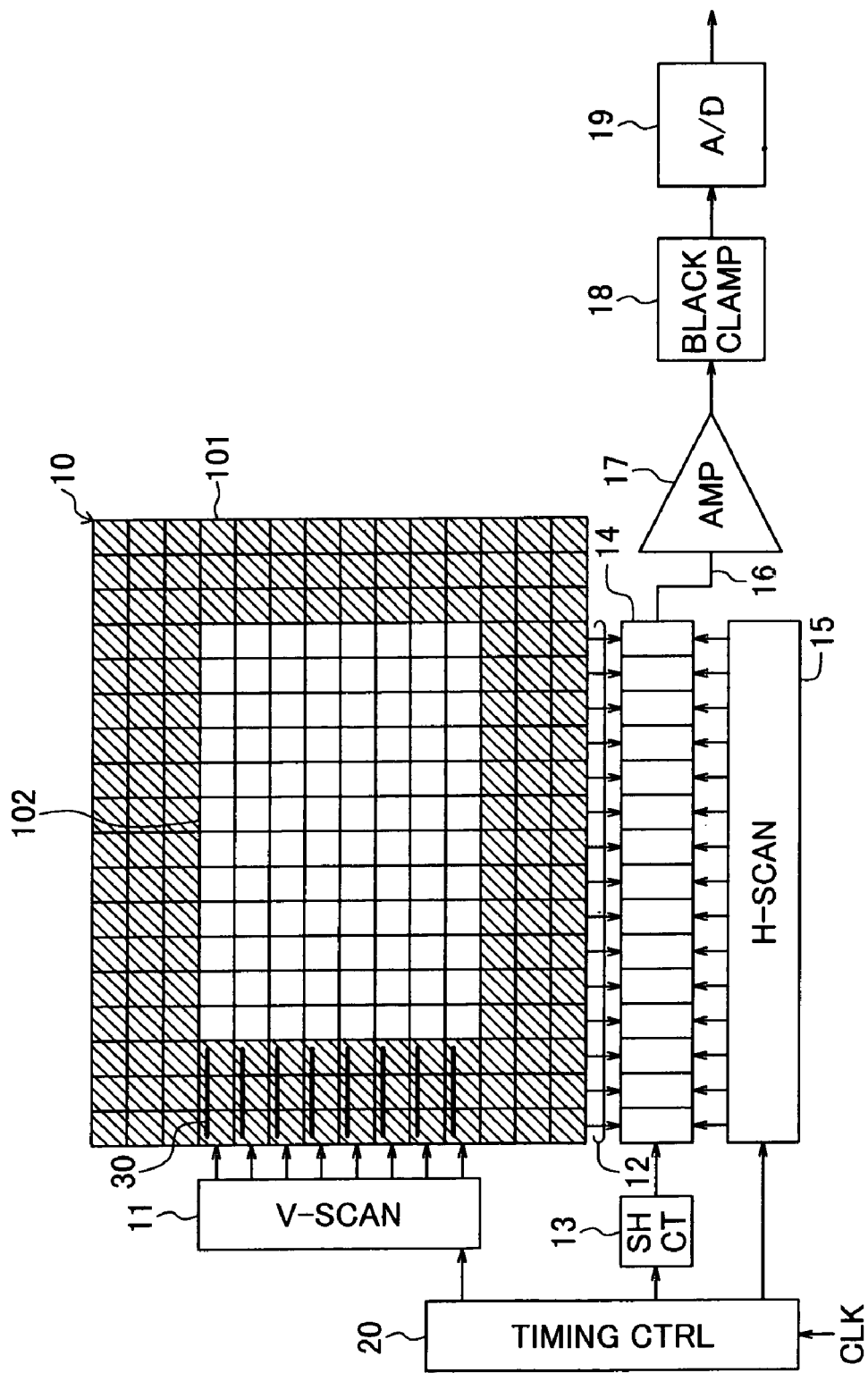
FIG. 1 is a schematic block diagram showing an image sensor of a first embodiment according to the present invention.

Referring now to the drawings, wherein like reference characters designate like or corresponding parts throughout several views, preferred embodiments of the present invention are described below.

First Embodiment

FIG. 1 is a schematic block diagram showing an image sensor of a first embodiment according to the present invention.

The image sensor is, for example, of a MOS type.

A pixel array 10 has pixels arranged in rows and columns. The hatched peripheral portion in the pixel array 10 is an optical black pixel region 101 in which light receiving elements are covered with a light shielding film such as an aluminum film. Since light can not enter into the light receiving elements in the optical black pixel region 101, only an integrated dark current signal is read out from this region. An area inside the optical black pixel region 101 is an effective pixel region 102 with no light shielding film thereon.

In the horizontal scanning start side of the optical black pixel region 101 and beneath the light shielding film, potential averaging lines 30 drawn with thick lines in FIG. 1 are formed along pixel rows.

Pixels of the optical black pixel region 101 are the same as those of the effective pixel region 102 only with the exception that the light shielding film is formed above the pixels of the optical black pixel region 101 and the potential averaging lines 30 are formed in some pixels of the optical black pixel region.

Figure 2:
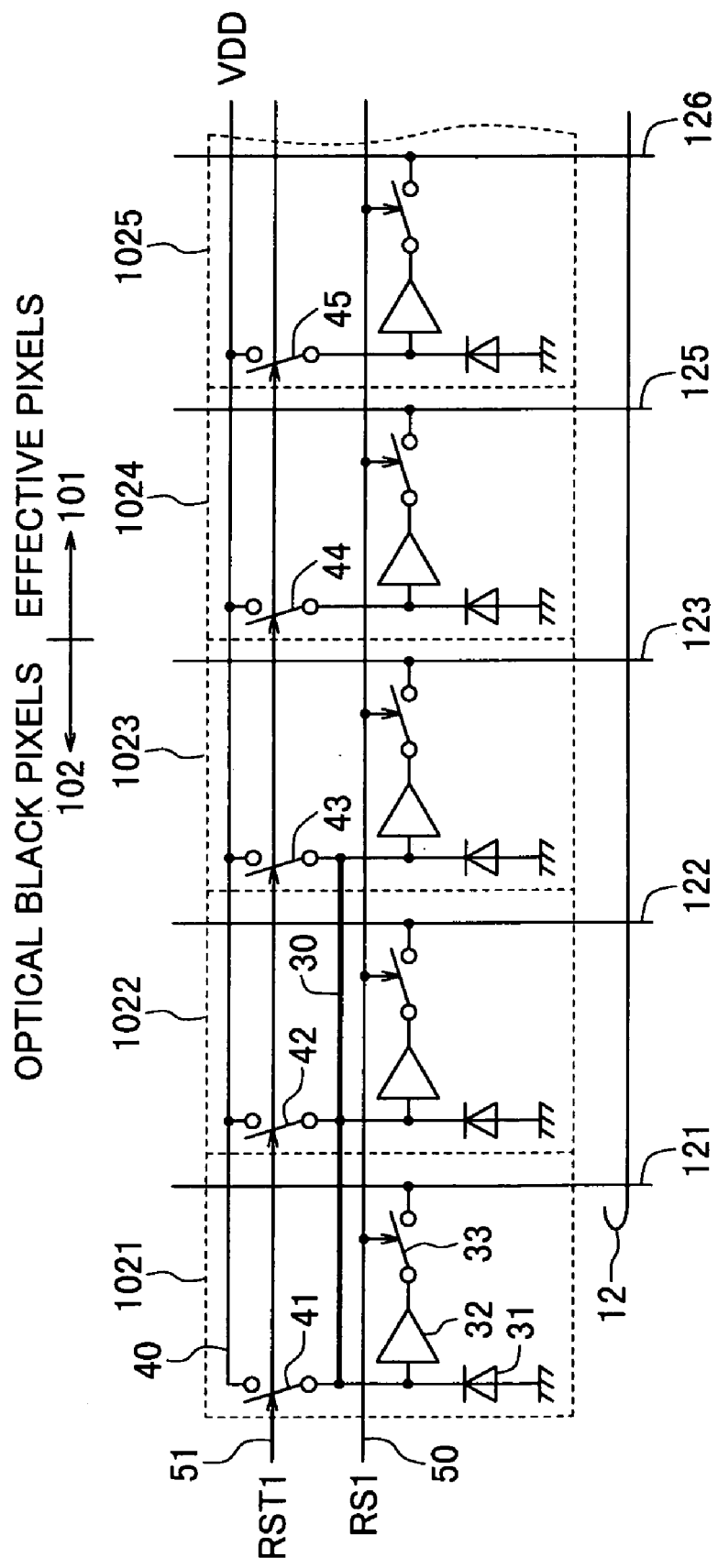
FIG. 2 is a circuit diagram of part of the pixel array of FIG. 1.

FIG. 2 is a circuit diagram of part of a pixel array 10 of FIG. 1.

In an optical black pixel 1021, the anode of a photodiode 31 as a light receiving element is connected to grounded, while the cathode of the photodiode 31 is connected, on one hand, through a buffer amplifier 32 and a read-out switch element 33 to a vertical bus line 121 and, on the other hand, through a reset switch element 41 to a reset potential supply line 40. The buffer amplifier 32 is, for example, a source follower circuit. Each of the read-out switch element 33 and the reset switch 41 is constituted of FET. Reset switch elements 42 to 45 are provided in respective pixels 1022 to 1025. The reset switch elements 42 to 45 are connected between the cathodes of photodiodes and the reset potential supply line 40.

The control inputs of the read-out switch elements on the same row are commonly connected to a row select line 50 which is a gate line, and the control inputs of the reset switch elements 41 to 45 are commonly connected to a row reset line 51 which is a gate line. To the row select line 50 and the row reset line 51, a row select signal RS1 and a reset signal RST1, respectively, are provided from a vertical scanning circuit 11 of FIG. 1. The reset ends (cathodes) of the photodiodes of the optical black pixels 1021 to 1023 are commonly connected to the potential averaging line 30 drawn with a thick line.

A read-out switch element 33 is turned on by a pulse of the row select signal RS1 and thereby the cathode potential of the photodiode 31 is read out through the buffer amplifier 32 and the read-out switch element 33 onto the vertical bus line 121. Similarly, in regard to the pixels 1022 to 1025, the cathode potentials of the photodiodes are read out through buffer amplifiers and read-out switch elements onto the vertical bus lines 122 to 126, respectively. Then, the reset switches 41 to 45 are turned on by a pulse of the reset signal RST1 and the cathode potentials of the photodiodes are reset to VDD.

Operations for read out and resetting on the pixels 1021 to 1025 are performed every frame period. In one frame period from a reset to the next reset, electric charges accumulated in the photodiodes of the effective pixels 1024 and 1025 are discharged by incident light and dark current, while the electric charges in the optical black pixels 1021 to 1023 are discharged only by dark current.

Referring back to FIG. 1, the vertical scanning circuit 11 including a shift register sequentially activates row select lines on the pixel array 10. Thereby, signals integrated on light receiving elements on a selected row are read out onto the vertical bus 12 (vertical read out). The read-out signals are held in respective sample and hold circuits 14 in response to activation of a control signal from a sample and hold control circuit 13. The light receiving elements on the selected row are reset as described above to start integration again.

The sample and hold circuits 14 are, for example, correlation double sampling circuits (CDS) and in this case, read out and holding of each integrated signal will be detailed as follows. Firstly, the sample and hold circuits 14 are reset. Then a voltage (an integrated signal Vx)+(a component DV depending on variation of characteristic of the buffer amplifier 32 and the read-out switch element 33 coupled to the photodiode 31) is sampled to corresponding one of the sample and hold circuits 14. Next the resetting is performed at the pixel on the selected row. Thereafter, a second sampling is performed to hold the difference Vx=(Vx+DV)−DV in the corresponding one of the sample and hold circuits 14.

The horizontal scanning circuit 15 including a shift register sequentially activates the sample and hold circuits 14 from left to right in FIG. 1 to read out signals therefrom onto a horizontal bus 16. The signal on the horizontal bus 16 is amplified by the amplifier circuit 17.

Figure 3:
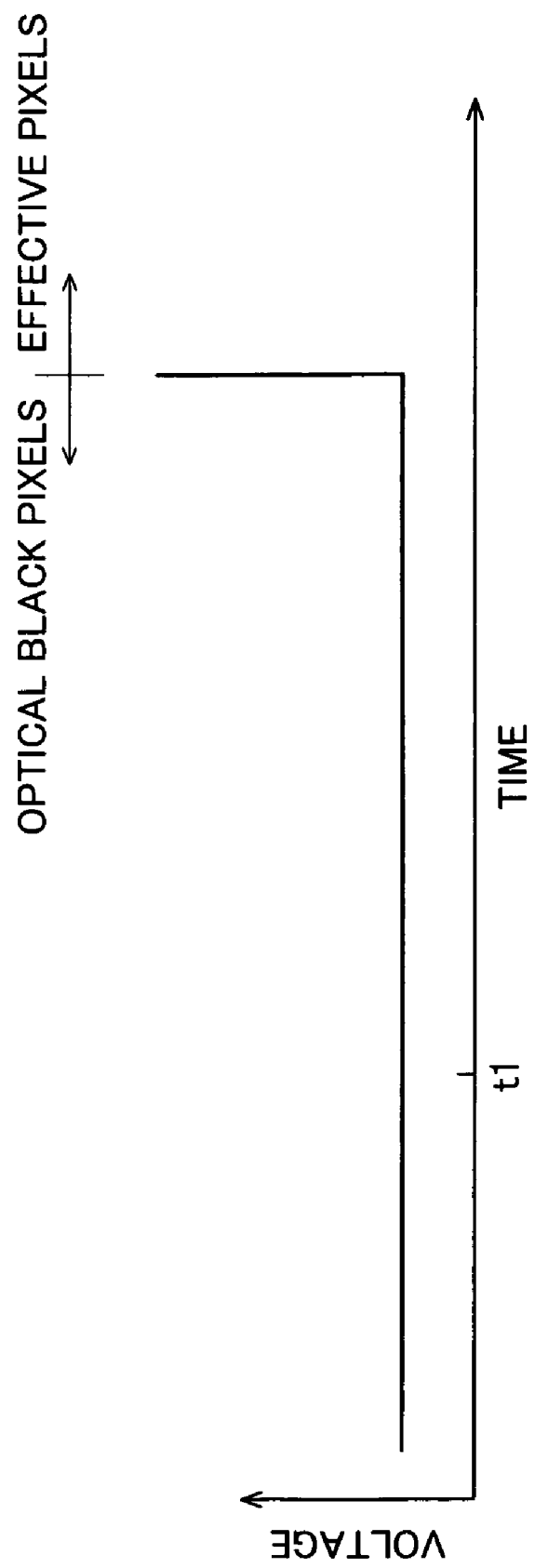
FIG. 3 is a graph showing an integrated dark current signal (voltage) read out from an optical black pixel region in a horizontal blanking period.

The integrated dark current signal are read out onto the horizontal bus 16 during each horizontal blanking period and the voltage thereof is constant as shown in FIG. 3. That is, since the voltage has been averaged prior to read out by the potential averaging line 30, no averaging in the black clamp circuit 18 is required. The black clamp circuit 18 samples the voltage, for example, at a time t1 of FIG. 3 and holds the sampled voltage as a black clamp level Vb. When reading out an integrated signal from an effective pixel, the black clamp circuit 18 subtracts the black clamp voltage Vb from the integrated voltage signal Vs on the horizontal bus 16. Such a black level correcting operation is performed on each horizontal line and called as line black clamp.

The black level corrected signal is converted to a digital value by an A/D converter circuit 19.

A timing control circuit 20 generates control signals for operating the vertical scanning circuit 11, the sample and hold circuit 13 and the horizontal scanning circuit 15 based on a clock signal CLK.

Referring back to FIG. 2, in the optical black pixels 1021 to 1023, since the reset ends of the photodiodes are commonly connected to the potential averaging line 30, the integrated dark current signals read out from the vertical bus lines 121 to 123 are almost equal to one another. Differences among the integrated dark current signals on the optical black pixels 1021 to 1023 caused by variations in characteristics of the buffer amplifiers 32 and the read-out switch elements 33 are removed through the above described operation by the sample and hold circuits 14.

In the first embodiment, since a reset node in each pixel on the same row in the optical black pixel region 101 is commonly connected to the potential averaging line 30, a potential averaging process is automatically performed prior to signal read out from the optical black pixel region 101 instead of an averaging process performed in the black clamp circuit 18 in the prior art, thereby stabilizing a read-out signal level. Hence, more correct line black clamp is realized, thereby reducing lateral stripe noise to improve image quality.

Further, since the integrated dark current signal has only to be sampled at a specific time, the construction of the black clamp circuit 18 can be more simplified than that of the prior art.

Second Embodiment

Figure 4:
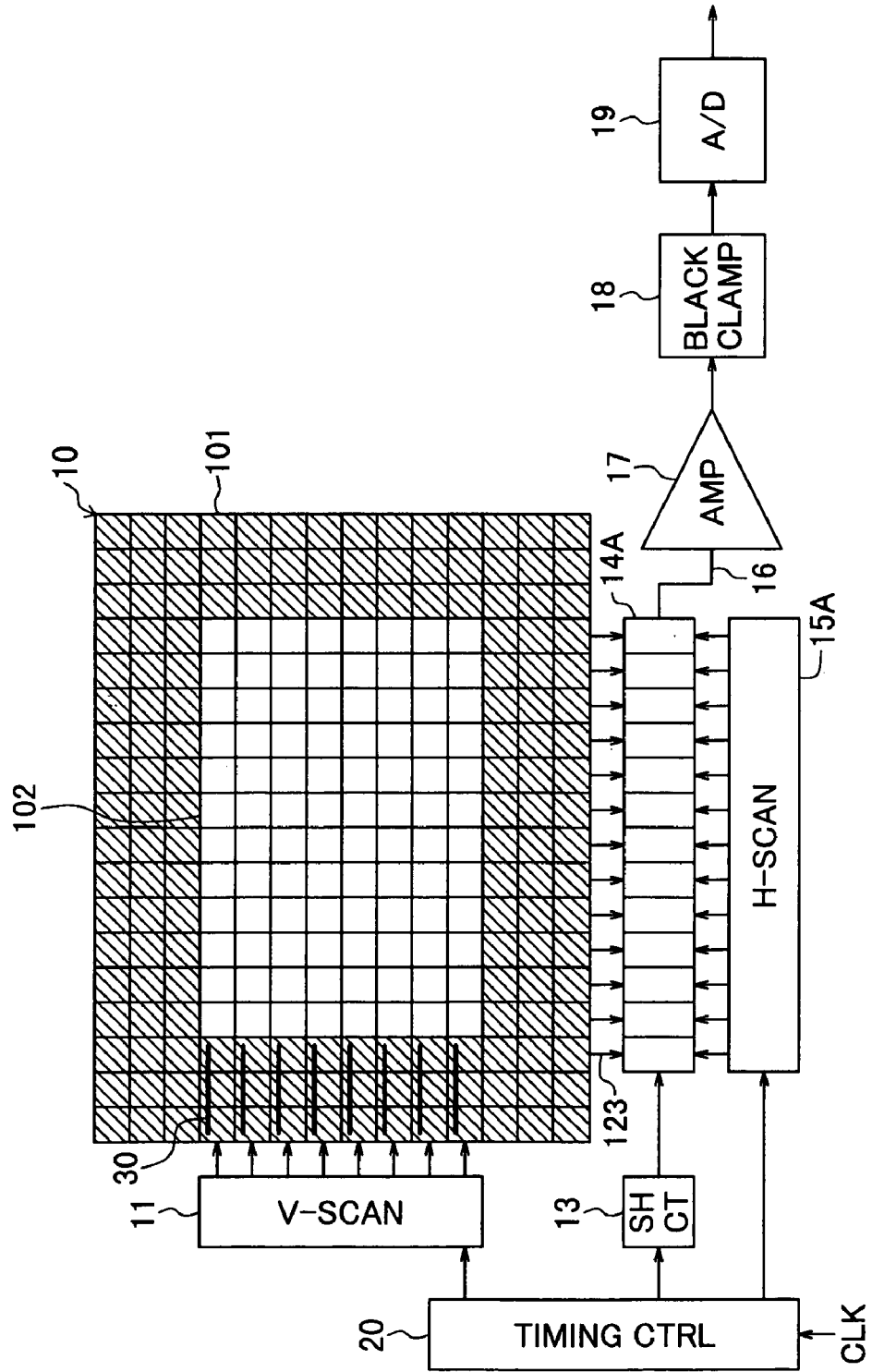
FIG. 4 is a schematic block diagram showing an image sensor of a second embodiment according to the present invention.

FIG. 4 is a schematic block diagram showing an image sensor of a second embodiment according to the present invention.

In this image sensor, among the vertical bus lines in the optical black pixel region 101, only the vertical line 123 of FIG. 2 is connected to the signal input of one of sample and hold circuits 14A.

Thereby, even when the number of pixels in the pixel array 10 is quite large and in turn the horizontal blanking period is short, the black clamp level can be correctly sampled by the black clamp circuit 18 in this short period.

Further, the number of the sample and hold circuits 14A and stages of a horizontal scanning circuits 15A can be smaller than that in the case of FIG. 1.

The other points are the same as that of the first embodiment.

Third Embodiment

Figure 5:
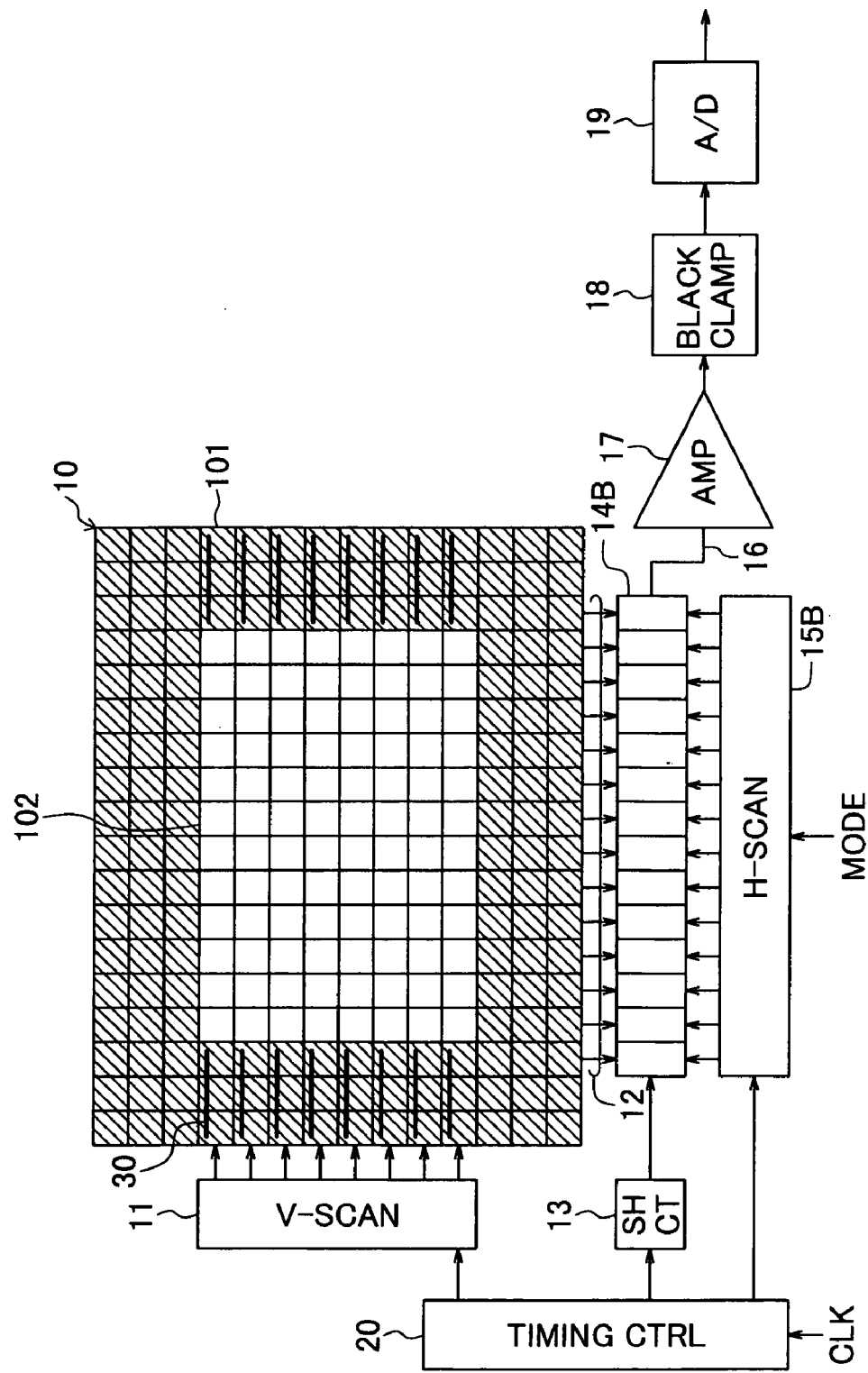
FIG. 5 is a schematic block diagram showing an image sensor of a third embodiment according to the present invention.

FIG. 5 is a schematic block diagram showing an image sensor of a third embodiment according to the present invention.

In this image sensor, a mode signal MODE is provided to a horizontal scanning circuit 15B. The circuit 15B scans from the left side to the right side in FIG. 5 when the mode signal MODE indicates a normal image mode, and scans in the opposite direction when the mode signal MODE indicates a left/right reverse image mode (or a top/bottom and left/right reverse image mode).

The black clamp level for each horizontal line is necessary to be determined prior to scanning effective pixels on the same line, potential averaging lines drawn with thick lines are formed on the both sides of the horizontal scanning lines. In each of the both sides, one vertical bus line is connected to the signal input of end one of the sample and hold circuit 14B.

The other points are the same as that of the second embodiment.

Fourth Embodiment

Figure 6:
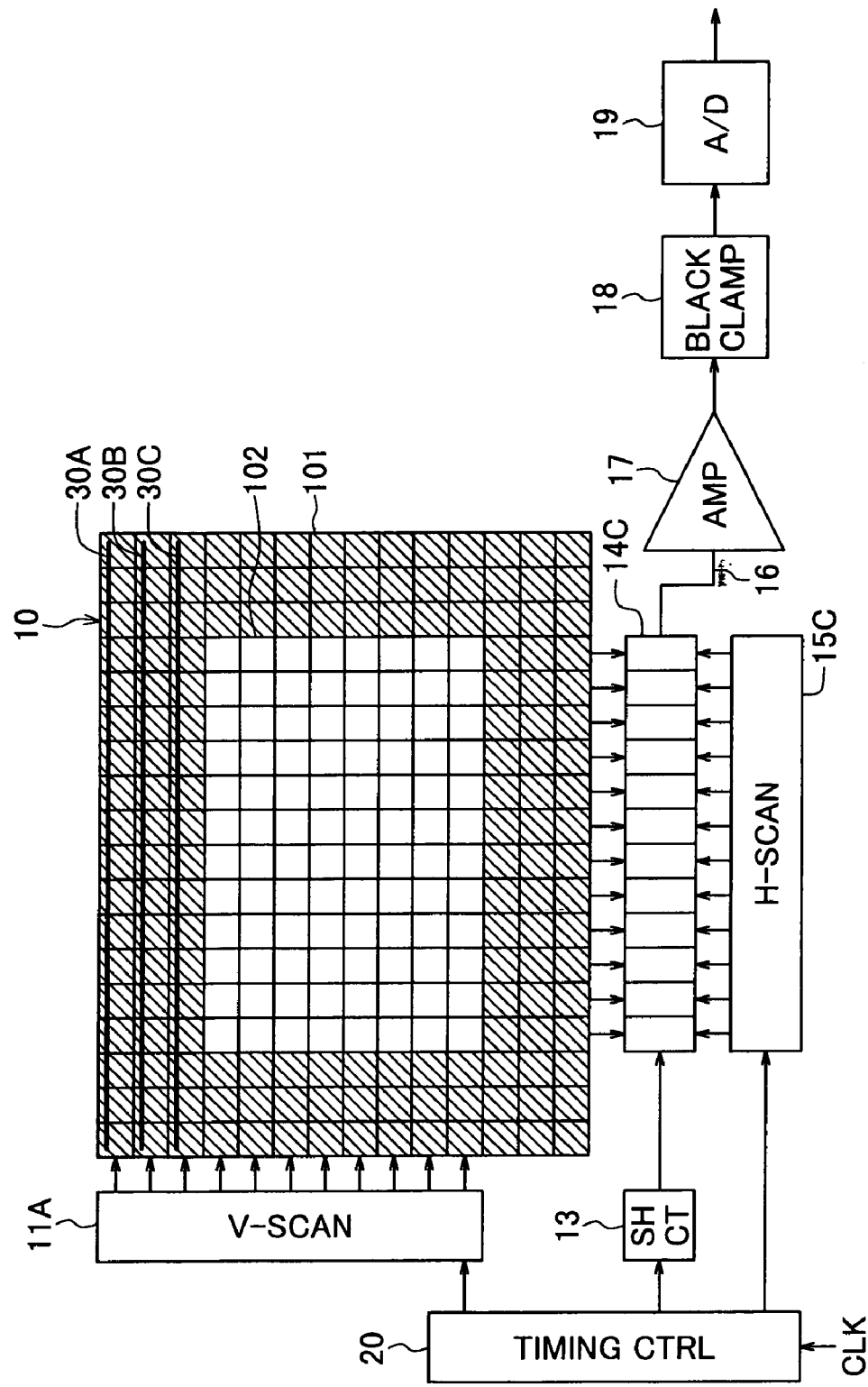
FIG. 6 is a schematic block diagram showing an image sensor of a fourth embodiment according to the present invention.

FIG. 6 is a schematic block diagram showing an image sensor of a fourth embodiment according to the present invention.

In this image sensor, in order to perform frame black clamp, potential averaging lines 30A to 30C are provided on respective pixel rows on the vertical scanning start side in the optical black pixel region 101.

The number of sample and hold circuits 14C and stages of a horizontal scanning circuit 15C is equal to the number of columns of the effective pixel region 102 and smaller than in the case of FIG. 4 by 1. Further, the number of stages of a vertical scanning circuit 11A is larger than that of rows of the effective pixel region 102 by the number of potential averaging lines.

Figure 7:
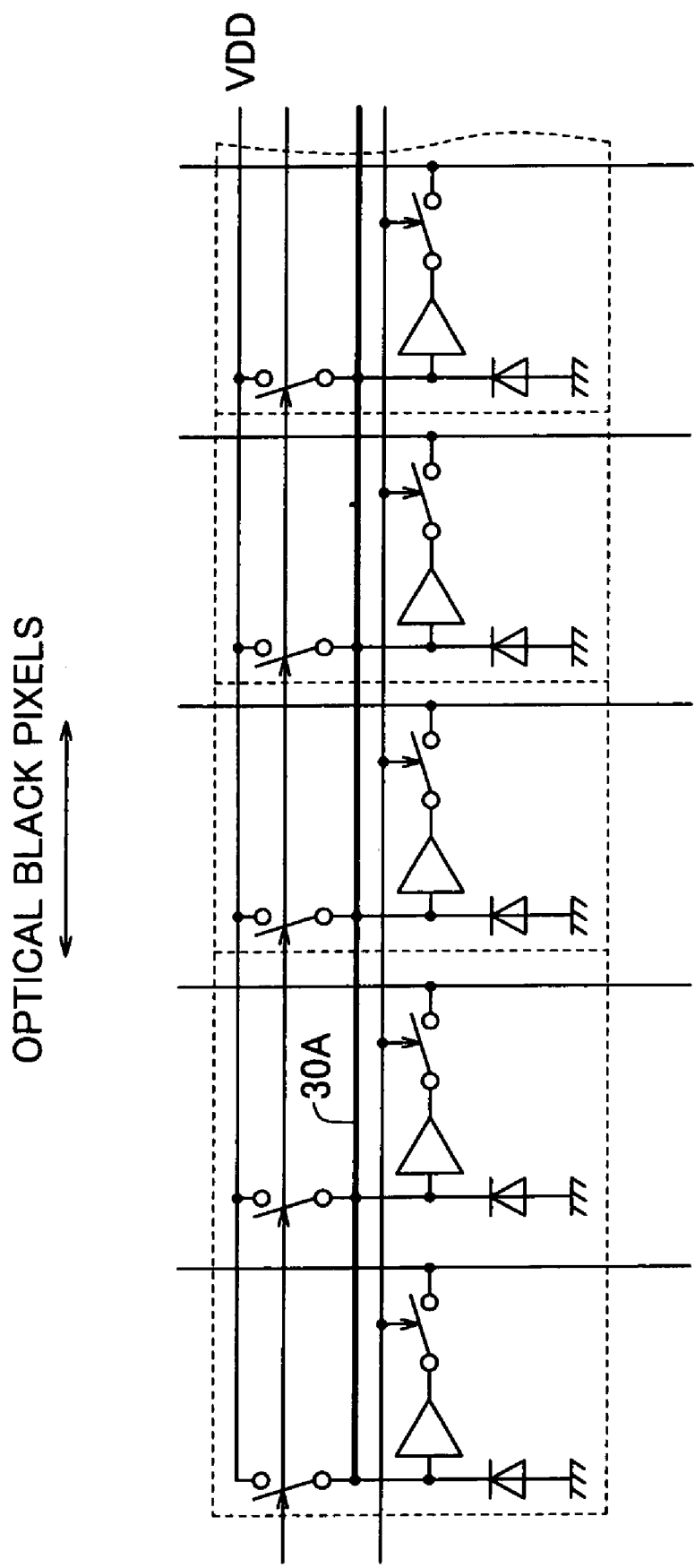
FIG. 7 is a circuit diagram showing the potential averaging line 30A of FIG. 6 and part of its peripheral circuitry.

FIG. 7 is a circuit diagram showing a potential averaging line 30A of FIG. 6 and part of peripheral circuitry thereof.

In FIG. 6, the black clamp circuit 18 has an integration circuit for obtaining an average of voltages read out from potential averaging lines 30A to 30C each through a buffer amplifier, a read-out switch and a vertical bus line. The black clamp circuit 18 holds the average as a black clamp level Vb and thereafter outputs the integrated light signal by subtracting the black clamp level Vb from the effective pixels' integrated signal Vs on the horizontal bus 16. Such a black pixel correcting operation is performed every frame and called as frame black clamp.

In the fourth embodiment, a similar effect as that of the first embodiment is obtained.

Fifth Embodiment

Figure 8:
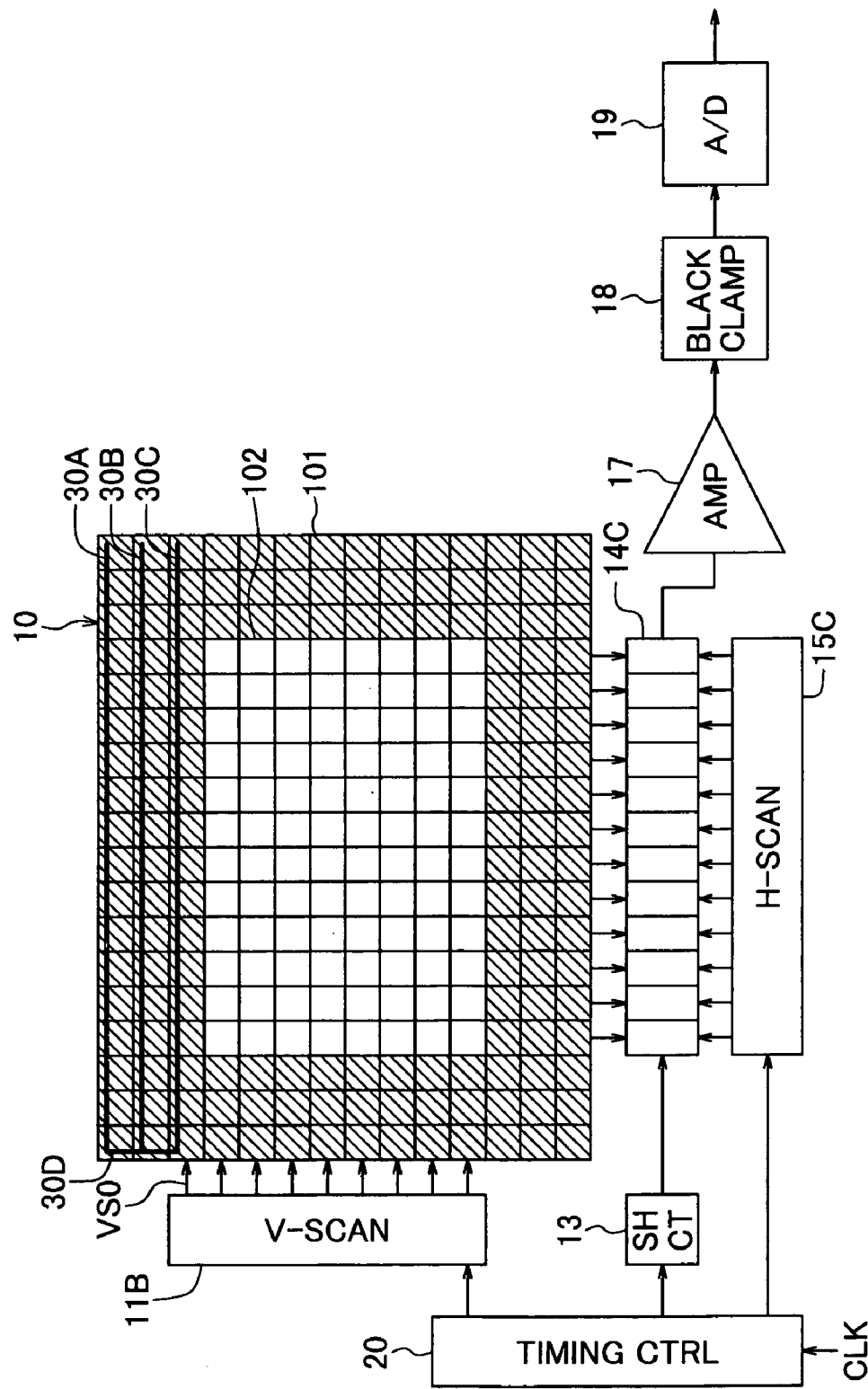
FIG. 8 is a schematic block diagram showing an image sensor of a fifth embodiment according to the present invention.

FIG. 8 is a schematic block diagram showing an image sensor of a fifth embodiment according to the present invention.

In this image sensor, potential averaging lines 30A to 30C are connected to each other through a common line 30D.

Figure 9:
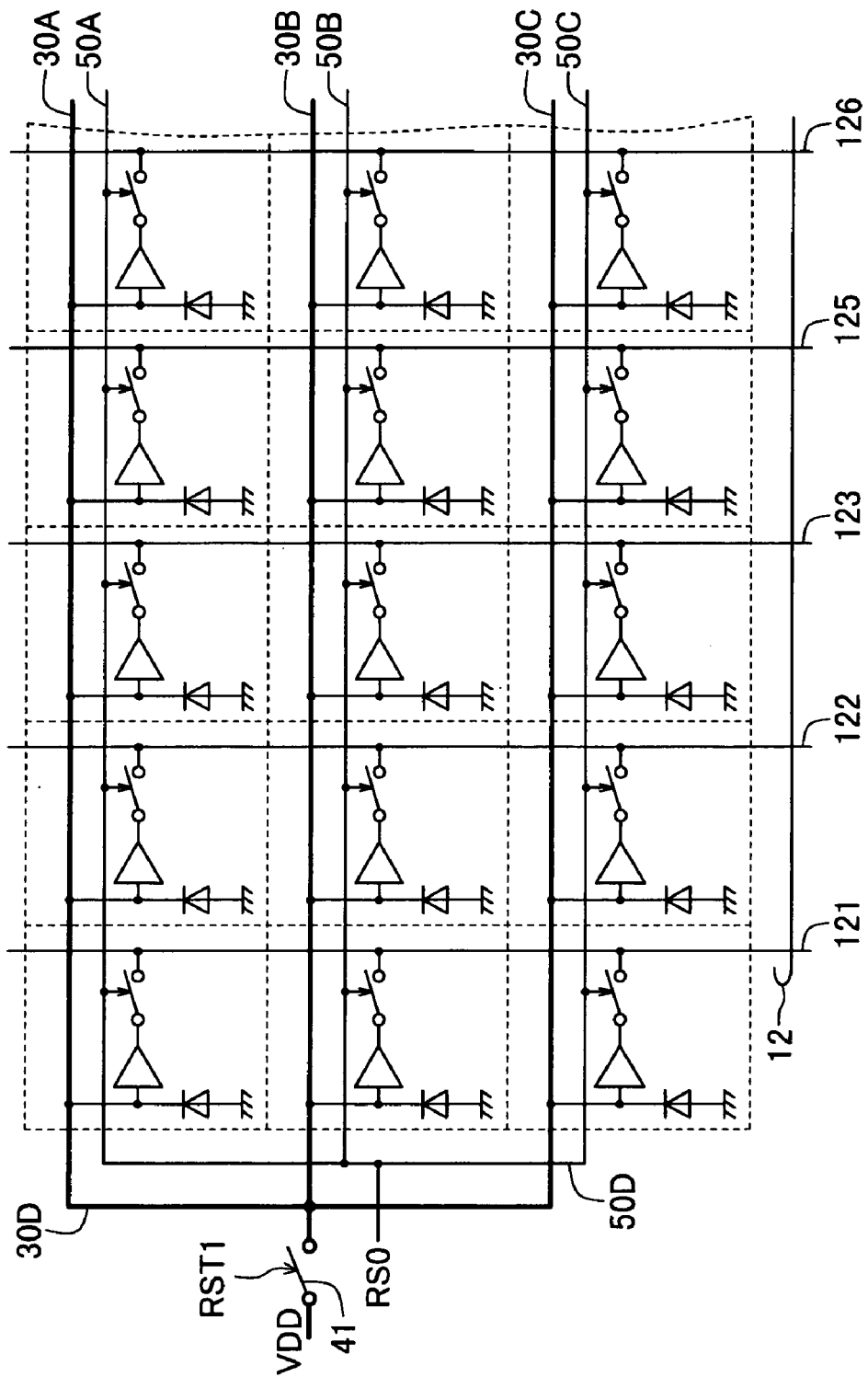
FIG. 9 is a circuit diagram showing the potential averaging lines 30A to 30D of FIG. 8 and part of their peripheral circuitry.

FIG. 9 shows potential averaging lines 30A to 30D of FIG. 8 and part of peripheral circuitry thereof.

The potential averaging lines 30A to 30D also function as the reset potential supply line 40 of FIG. 2. That is, the reset switch element 41 commonly used for three pixel rows is connected to the common line 30D. Since an integrated dark current signal in common with the three pixel rows can be read out from each vertical bus line, the row select lines 50A, 50B and 50C for the three pixel rows are also commonly connected to each other through a common line 50D, and a row select signal RS0 is provided to the common line 50D to commonly turn on/off read-out switch elements for the three pixel rows.

Since only the row select signal RS0 is sufficient for the three pixel rows, the number of stages of the vertical scanning circuit 11B is larger than the number of rows in the effective pixel region 102 by one, and the configuration thereof is thus simpler than that of the vertical scanning circuit 11A of FIG. 6.

Further, since the black clamp period in the vertical blanking period can be ⅓ of that in the case of the fourth embodiment, the fifth embodiment is especially advantageous in a case where the number of pixels of the pixel array 10 is quite large and therefore the vertical blanking period is short.

The other points are the same as that of the fourth embodiment.

Sixth Embodiment

Figure 10:
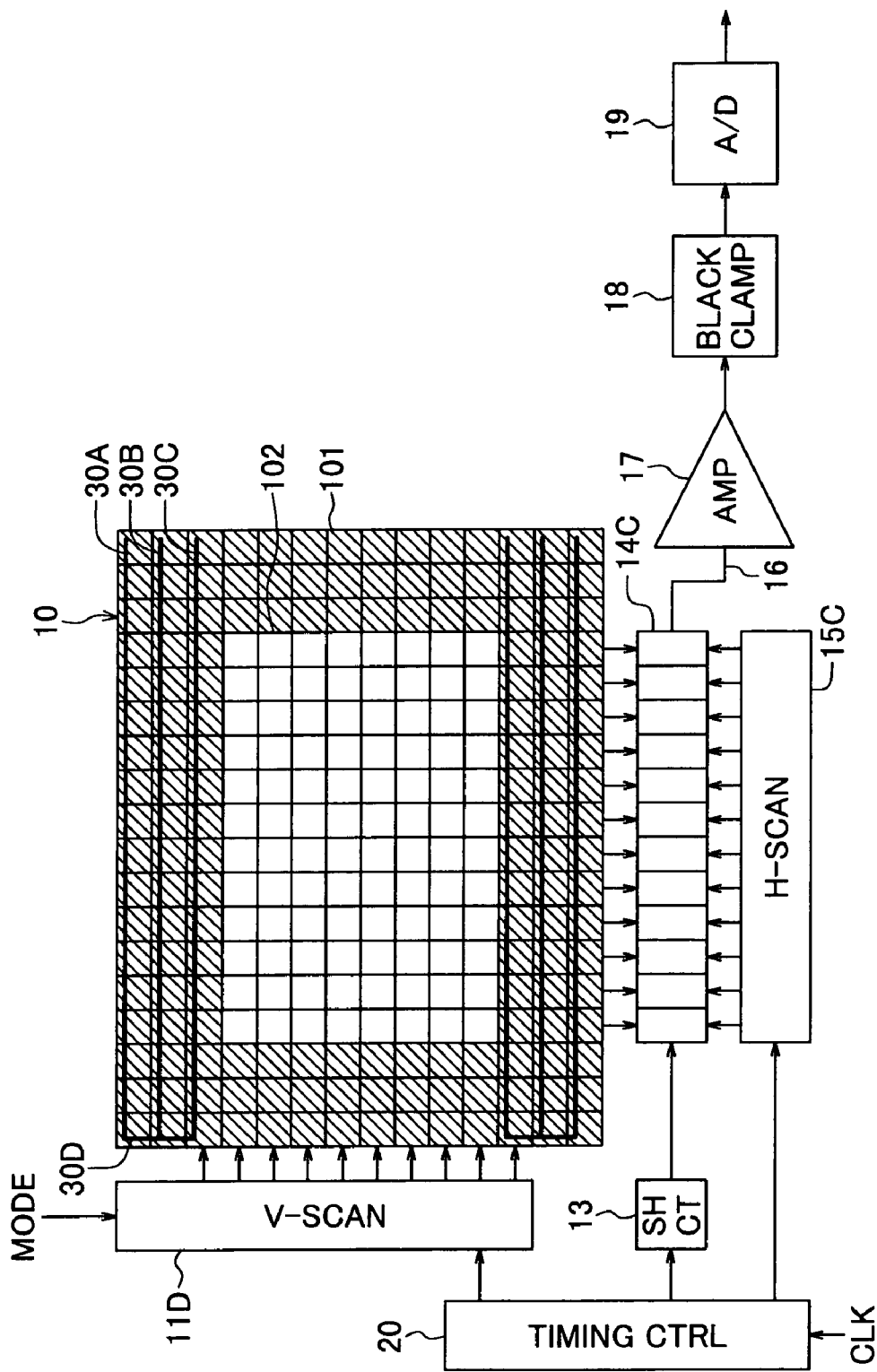
FIG. 10 is a schematic block diagram showing an image sensor of a sixth embodiment according to the present invention.

FIG. 10 is a schematic block diagram showing an image sensor of a sixth embodiment according to the present invention.

In this image sensor, the mode signal MODE is provided to the vertical scanning circuit 11D which scans from the top side to the bottom side in FIG. 10 when the mode signal MODE indicates a normal image mode, and scans in the opposite direction when the mode signal MODE indicates a top/bottom reverse image mode (or an top/bottom and left/right reverse image mode).

Since the black clamp level for each frame is necessary to be determined prior to scanning effective pixels on the same frame, potential averaging lines drawn with thick lines are formed on the both sides of the vertical scanning.

In each sides, one row select signal (commonly used for a plurality of rows) is connected to the output of the vertical scanning circuit 11D.

The other points are the same as that of the fifth embodiment.

Seventh Embodiment

Figure 11:
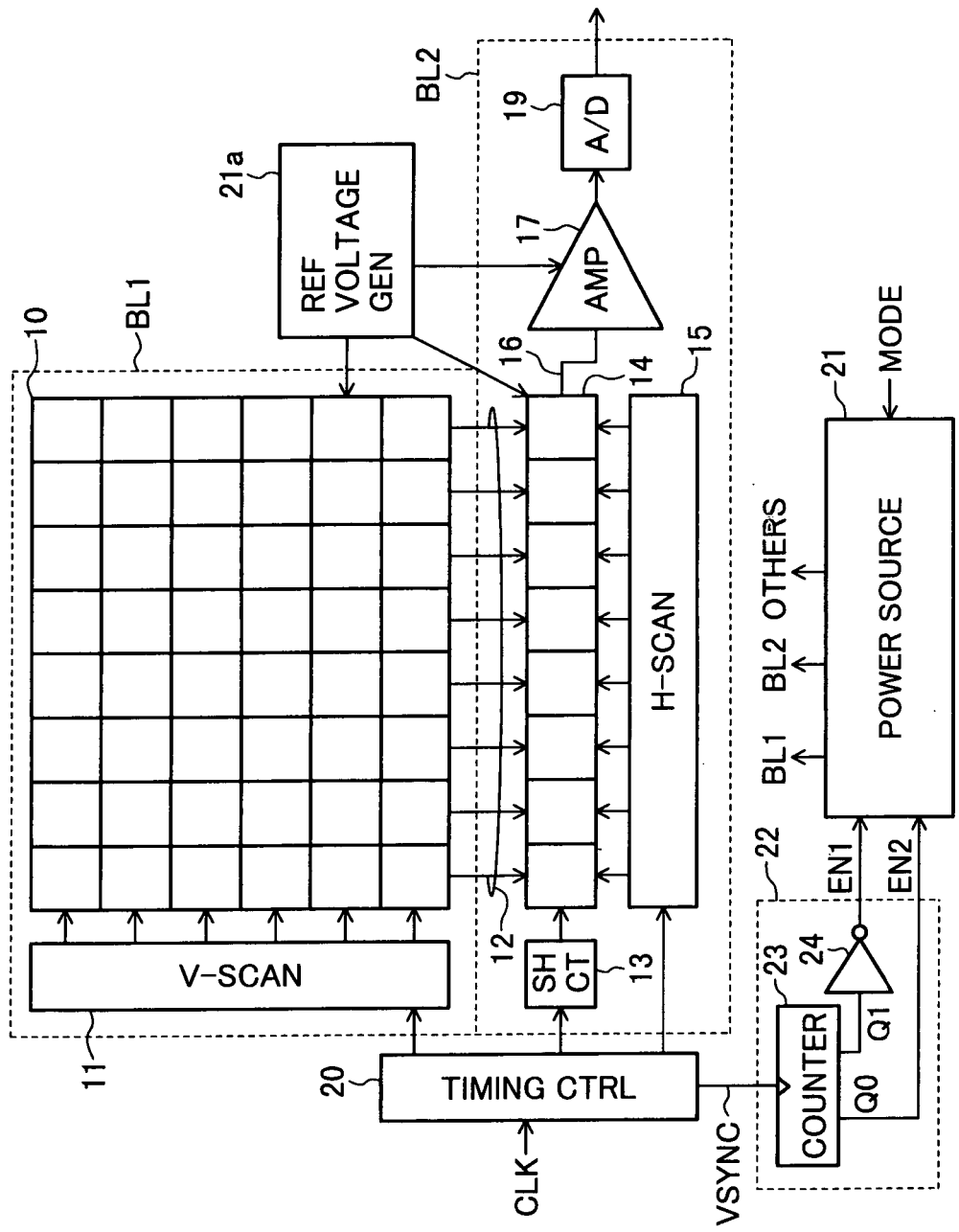
FIG. 11 is a schematic block diagram showing an image sensor of a seventh embodiment according to the present invention.

FIG. 11 is a schematic block diagram showing an image sensor of a seventh embodiment according to the present invention.

A reference voltage generating circuit 21a supplies a reset voltage to the pixel array 10 and reference voltages to the sample and hold circuits 14 and the amplifier circuit 17. The reference voltage generating circuit 21a is a constituent of a power source circuit 21.

A mode signal MODE is provided to the power source circuit 21, and the power source circuit 21 supplies power source voltages to circuits at all times when the mode signal indicate a normal mode. The power source circuit 21 supplies the power source voltage to a block BL1 during an enable signal EN1 from a power source control circuit 22 is active and ceases the supply during the signal EN1 is inactive, while supplying the power source voltages to a block BL2 during an enable signal EN2 from the power source control circuit 22 is active and ceases the supply during the signal EN2 is inactive.

The block BL1 includes the pixel array 10 and the vertical scanning circuit 11. The block BL2 includes the sample and hold control circuit 13, the sample and hold circuits 14, the horizontal scanning circuit 15, the amplifier circuit 17 and the A/D converter circuit 19. Although the block BL2 includes the black clamp circuit as well, it is omitted for simplification and this applies in the below other embodiments.

The power source circuit 21 supplies a power source voltage to the timing control circuit 20 and the power source control circuit 22 at all times even in a low power consumption mode.

Since the reference voltage generating circuit 21a is a constituent of the power source circuit 21, the reference voltage generating circuit 21a supplies the reset voltage to the pixel array 10 when the power source circuit 21 supplies the power source voltage to the block BL1, while the reference voltage generating circuit 21a supplies the reference voltages to the sample and hold circuits 14 and the amplifier circuit 17 when the power source circuit 21 supplies the power source voltage to the block BL2.

In the power source control circuit 22, a vertical sync signal VSYNC from the timing control circuit 20 is provided to the clock input of a counter 23, the lowest bit Q0 of the counter provides the enable signal EN2 and the highest bit Q1 of the counter 23 is provided to an inverter 24 to generate the enable signal EN1. The counter 23 outputs counts 0, 1 and 2 cyclically and the enable signal EN1 is high when the count is 0 or 1, while the enable signal EN2 is high when the count is 1.

Figure 12:
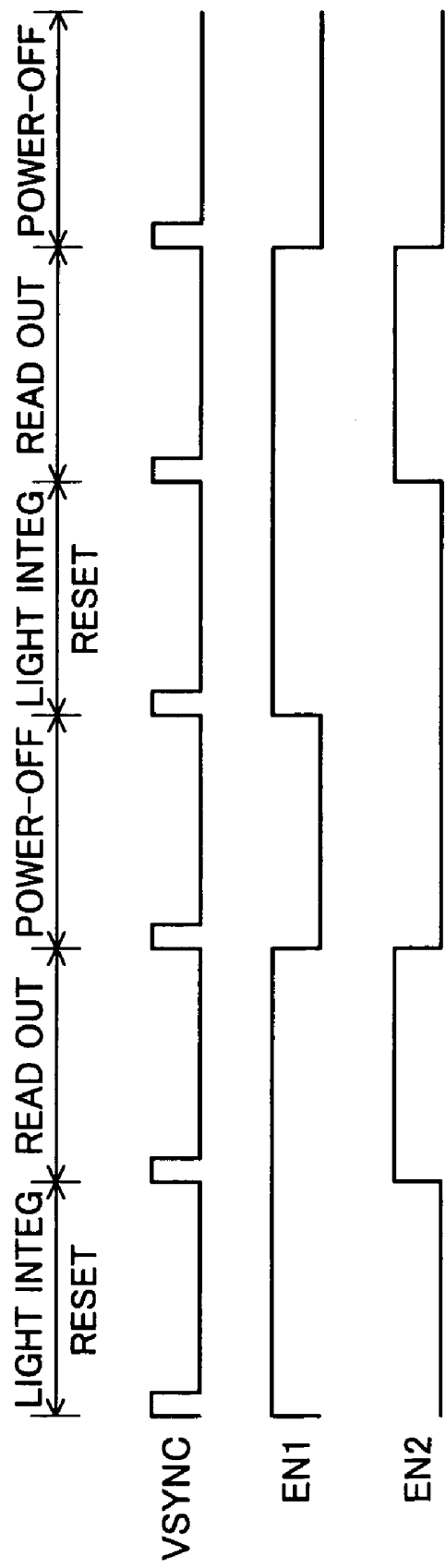
FIG. 12 is a time chart showing operation of the power source control circuit of FIG. 11.

FIG. 12 is a time chart showing operation of the power source control circuit 22 of FIG. 11.

Next, description will be given of operation of the image sensor configured as described above in a case of low power consumption mode.

In an initial state, assume that the count of the counter 23 is 2. In this state, the power source voltages are supplied to neither of the blocks BL1 and BL2.

(Light Integration Period)

In response to the rising edge of the vertical sync signal VSYNC, the count of the counter 23 becomes 0 and the enable signal EN1 goes high and the power source voltage is supplied to the block BL1.

The pixel lines are sequentially activated by the vertical scanning circuit 11 in response to the control signal from the timing control circuit 20. That is, the above described vertical read out and resetting are sequentially performed line by line. Since the power source voltages are not supplied to the block BL2, no power consumption thereof arises.

(Reading-Out Period)

In response to the rising edge of a vertical sync signal VSYNC, the count of the counter 23 becomes 1 and the enable signal EN2 goes high and the power source voltages are also supplied to the block BL2.

In the block BL1, the pixel lines are sequentially activated and the vertical read out and resetting are performed line by line. In the block BL2, the horizontal read out is performed each time after pixel signals from selected one row are latched in the sample and hold circuits 14.

That is, operation in the read out period is the same as that in the normal mode.

(Power-Off Period)

In response to the rising edge of a vertical sync signal VSYNC, the count of the counter 23 becomes 2 and the enable signals EN1 and EN2 go low to cease the supply of the power source voltages to the blocks BL1 and BL2.

The periods of the light integration, the read out and the power-off described above are cyclically repeated.

Consumed currents are, for example, as follows:
about 1 mA into the pixel array 10,
about 3 mA in total to the vertical scanning circuit 11, the sample and hold control circuits 13, the horizontal scanning circuit 15, the timing control circuit 20 and the power source control circuit 22, about 2.5 mA into the sample and hold circuits 14,
about 8 mA into the amplifier circuit 17,
about 12 mA into the A/D converter circuit 19,
about 0.5 mA into the reference voltage generating circuit 21a, and
about 22.5 mA in total to the sample and hold circuits 14, the amplifier circuit 17 and the A/D converter circuit 19 in the block BL2, wherein this current is comparatively large.

According to this seventh embodiment, power supply to the block BL2 ceases in the light integration period and moreover, power supply to the blocks BL1 and BL2 ceases in the power-off period, therefore, in a 10 frame period for example, power consumption of the image sensor can be reduced to about ⅓ of that in the normal mode.

Eighth Embodiment

Figure 13:
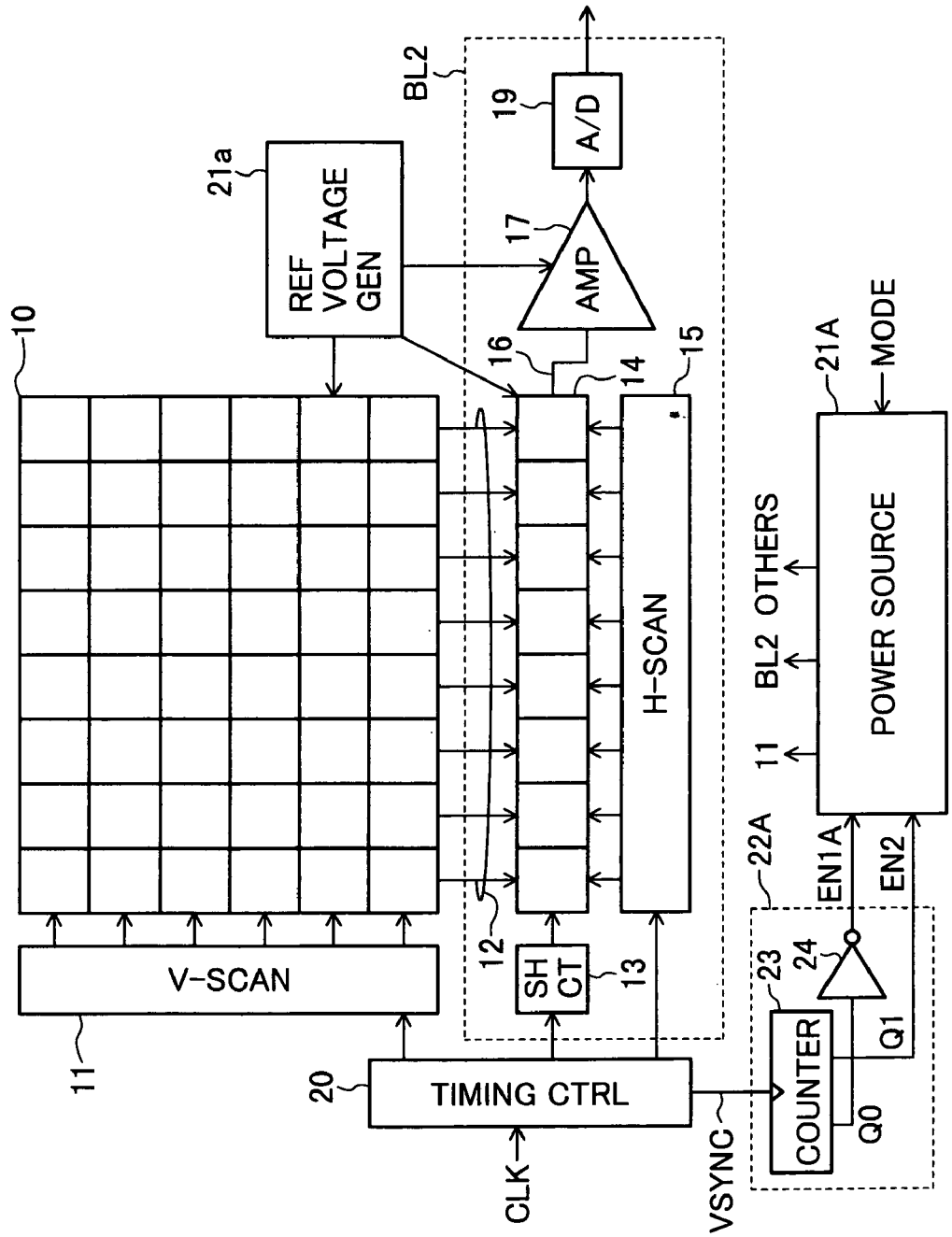
FIG. 13 is a schematic block diagram showing an image sensor of an eighth embodiment according to the present invention.

FIG. 13 is a schematic block diagram showing a image sensor of an eighth embodiment according to the present invention.

A power source circuit 21A supplies its power source voltage to the pixel array 10 at all times even in the low power consumption mode.

In the low power consumption mode, the power source circuit 21A supplies the power source voltage to the vertical scanning circuit 11 during an enable signal EN1A is active, while ceasing the supply during the enable signal EN1A is inactive.

In a power source control circuit 22A, the output bit Q0 of the counter 23 is provided to the inverter 24 to generate the enable signal EN1A and the output bit Q1 of the counter 23 provides an enable signal EN2.

The other constituents are the same as those of FIG. 11.

Figure 14:
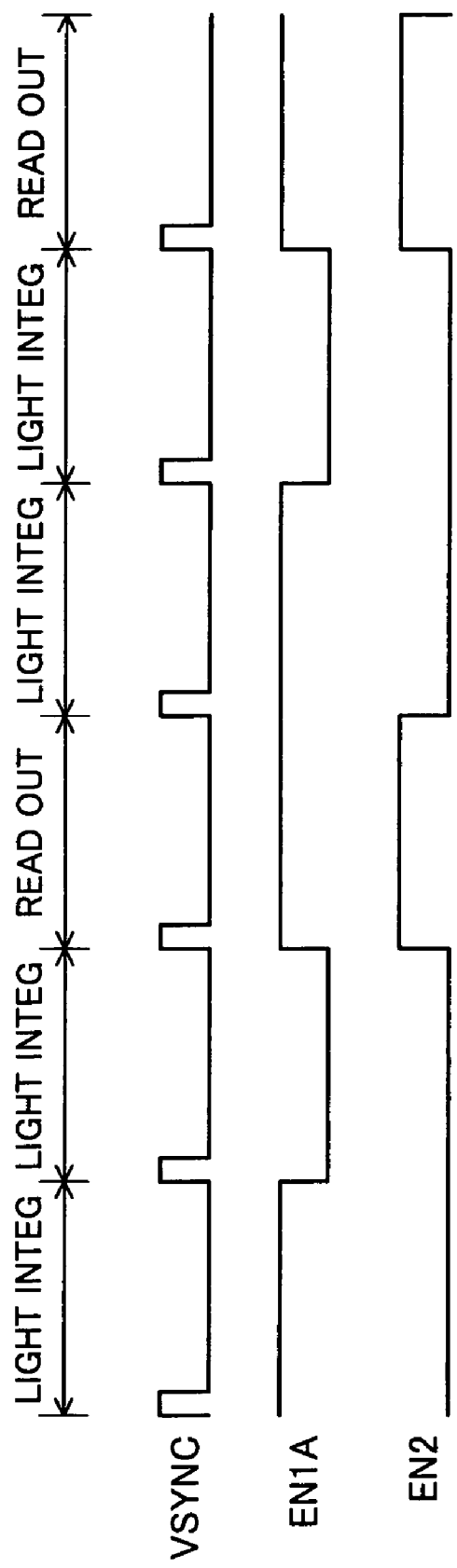
FIG. 14 is a time chart showing operation of the power source control circuit of FIG. 13.

FIG. 14 is a time chart showing operation of the power source control circuit 22A of FIG. 13.

Next, description will be given of operation of the image sensor configured as describe above in a case of the low power consumption mode.

In an initial state, assume that the count of the counter 23 is 2. In this state, the power source voltages are supplied to the vertical scanning circuit 11 and the block BL2.

(First Light Integration Period)

In response to the rising edge of the vertical sync signal VSYNC, the count of the counter 23 becomes 0, the enable signal EN2 goes low and supply of the power source voltage to the block BL2 ceases.

The vertical scanning circuit 11 performs vertical scanning in response to the control signal from the timing control circuit 20. Thereby, the above described read out and resetting are performed line by line.

(Second Light Integration Period)

In response to the rising edge of the vertical sync signal VSYNC, the count of the counter 23 becomes 1 and the enable signal EN1A goes low and supply of the power source voltage to the vertical scanning circuit 11 ceases.

Thereby, only the light integration is performed in the pixel array 10.

(Reading-Out Period)

In response to the rising edge of the vertical sync signal VSYNC, the count of the counter 23 becomes 2, the enable signals EN1 and EN2 go high and the power source voltages are supplied to the blocks BL1 and BL2.

Thereby, the same operation as read out in the seventh embodiment is performed.

The periods of first and second light integration and reading-out described above are cyclically repeated.

According to this eight embodiment, supply of the power source voltage to the block BL2 is cut off in the first and second light integration periods and the state is close to power-off. Therefore in a 15 frame periods for example, power consumption of the image sensor can be reduced to a value lower than 50% of that in the normal operation mode. Further, light integration periods are twice as long as in the first embodiment to improve sensitivity of the image sensor.

Note that the second light integration period may be a plurality of frames to increase the length of the light integration period by replacing the counter 23 of the power source control circuit 22A with a scale-of-N counter, where N>3, and changing logic circuit configuration.

Ninth Embodiment

Figure 15:
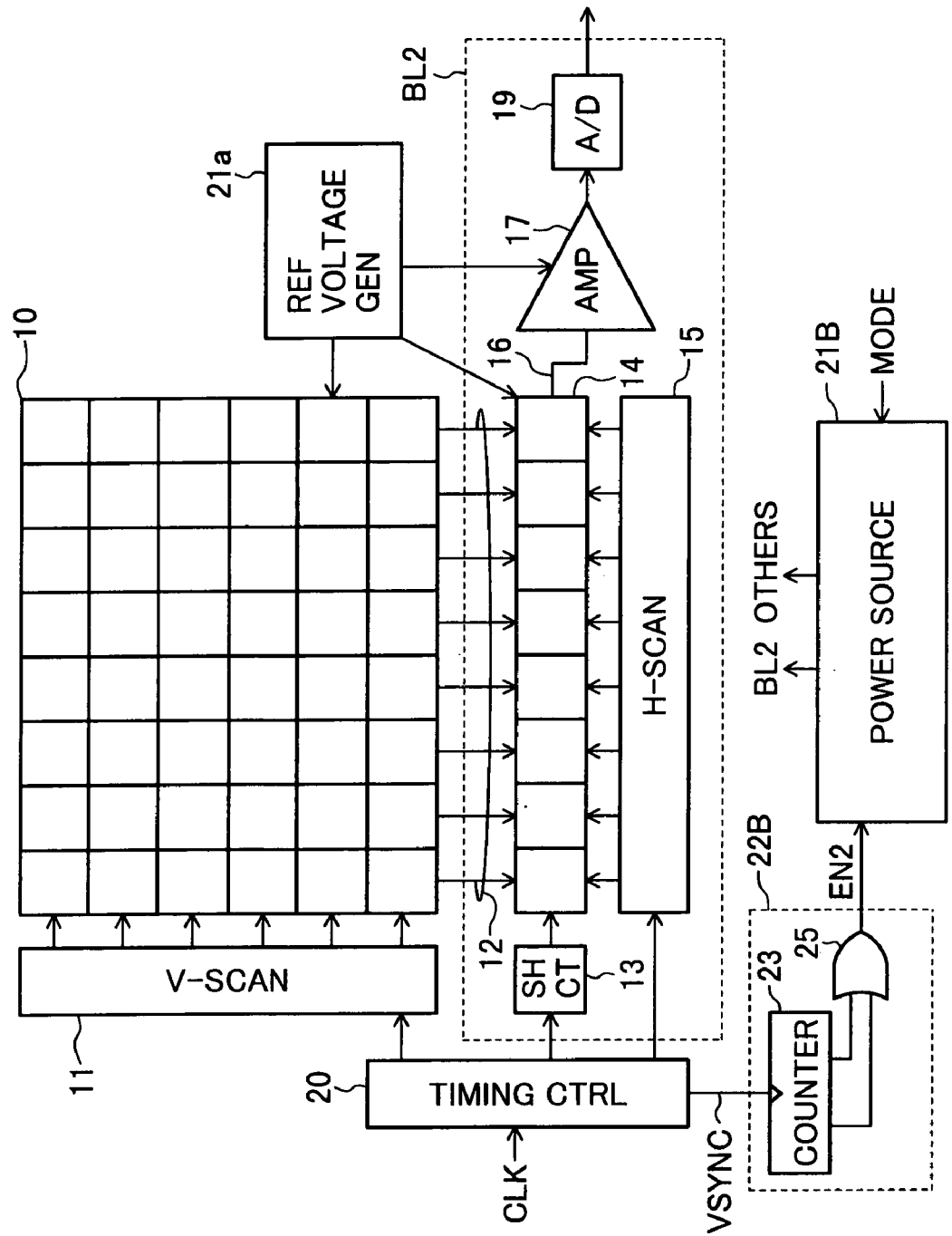
FIG. 15 is a schematic block diagram showing an image sensor of a ninth embodiment according to the present invention.

FIG. 15 is a schematic block diagram showing a image sensor of a ninth embodiment according to the present invention.

A power source circuit 21B supplies the power source voltage to the pixel array 10 and the vertical scanning circuit 11 at all times even in the low power consumption mode. Therefore, there is no need to provide the enable signal EN1 to the power source circuit 21B.

In a power source control circuit 22B, the output bits Q0 and Q1 of the counter 23 are provided to an OR gate 25 to generate the enable signal EN2.

The other constituents are the same as that of FIG. 11.

Figure 16:
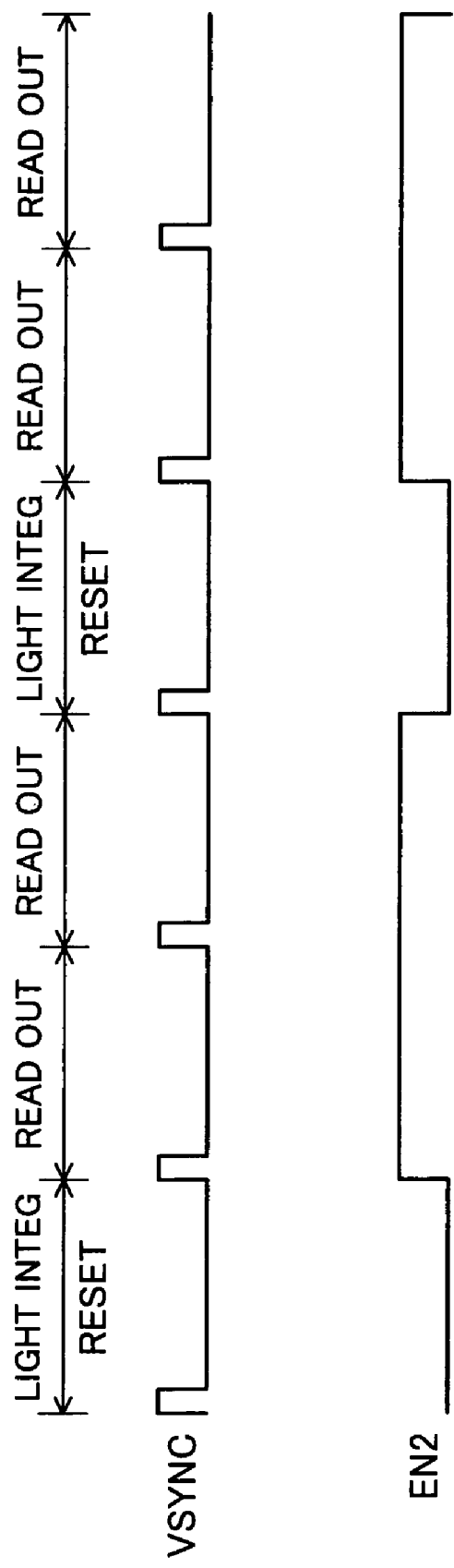
FIG. 16 is a time chart showing operation of the power source control circuit of FIG. 15.

FIG. 16 is a time chart showing operation of the power source control circuit 22B of FIG. 15.

Next, description will be given of operation of the image sensor configured as described above in the case of the low power consumption mode.

In an initial state, assume that the count of the counter 23 is 2. In this state, the power source voltage is supplied to the block BL2.

(Light Integration Period)

In response to the rising edge of the vertical sync signal VSYNC, the count of the counter 23 becomes 0 and the enable signal EN2 goes low and supply of the power source voltage to the block BL2 ceases.

The vertical scanning circuit 11 performs vertical scanning in response to the control signal from the timing control circuit 20. Thereby, the above-described vertical read out and resetting are performed line by line.

(First Read Out Period)

In response to the rising edge of the vertical sync signal VSYNC, the count of the counter 23 becomes 1 and the enable signal EN2 goes high and the power source voltages are supplied to the block BL2.

Thereby, the same operation as the read out in the seventh embodiment is performed.

(Second Read Out Period)

The count of the counter 23 becomes 2 in response to the rising edge of the vertical sync signal VSYNC and the enable signal EN2 remains high.

Thereby, the same operation as the read out described above is performed.

The periods of such light integration, first read out and second read out are cyclically repeated.

According to this ninth embodiment, since supply of the power source voltages to the block BL2 are cut off in the light integration period, the state is close to power-off and power consumption of the image sensor can be reduced to about ⅔ of that in the normal operation mode. Moreover, since read out is performed in two of three frames, a frame rate can be increased to twice as large as that in the seventh embodiment.

Tenth Embodiment

Figure 17:
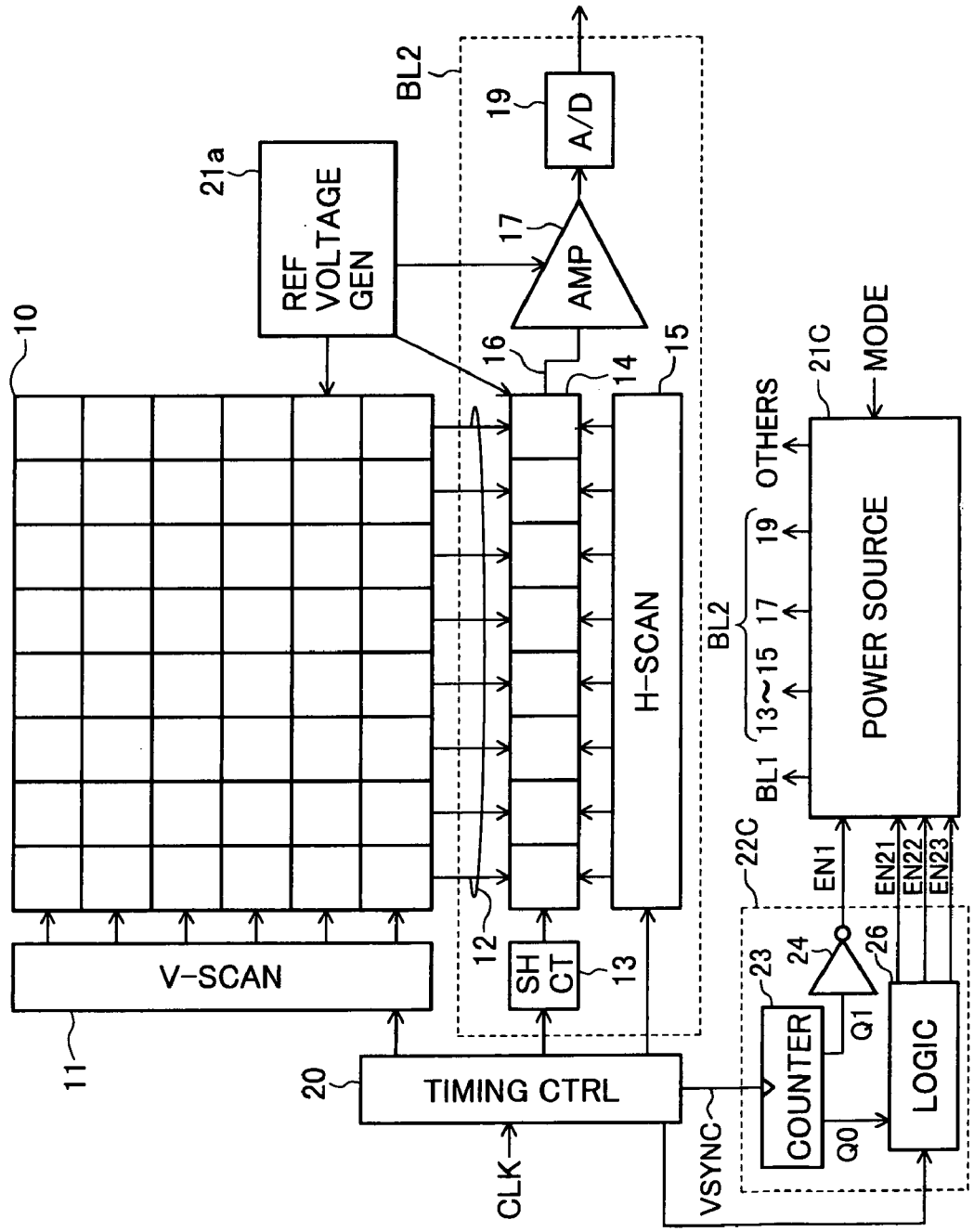
FIG. 17 is a schematic block diagram showing an image sensor of a tenth embodiment according to the present invention.

FIG. 17 is a schematic block diagram showing an image sensor of a tenth embodiment according to the present invention.

This image sensor is analogous to that of FIG. 11 but differs from the seventh embodiment in that the enable signal EN2 of FIG. 11 is divided into enable signals EN21 to EN23.

In the low power consumption mode, a power source circuit 21C supplies the power source voltages as follows: during the enable signal EN21 is active to the sample and hold control circuit 13, the sample and hold circuits 14 and the horizontal scanning circuit 15, during the enable signal EN22 is active to the amplifier circuit 17, and during the enable signal 23 is active to the A/D converter circuit 19.

Figure 18:
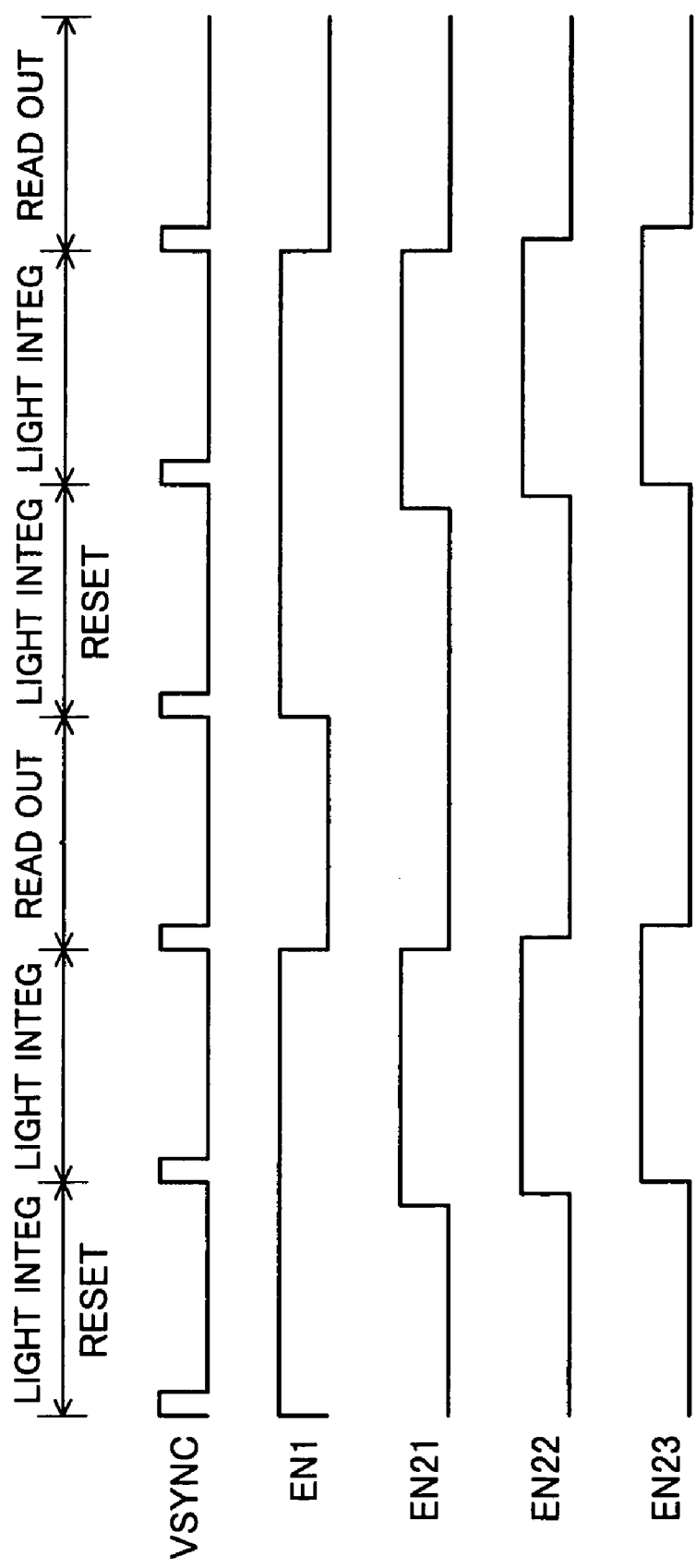
FIG. 18 is a time chart showing operation of the power source control circuit of FIG. 16.
Figure 19:
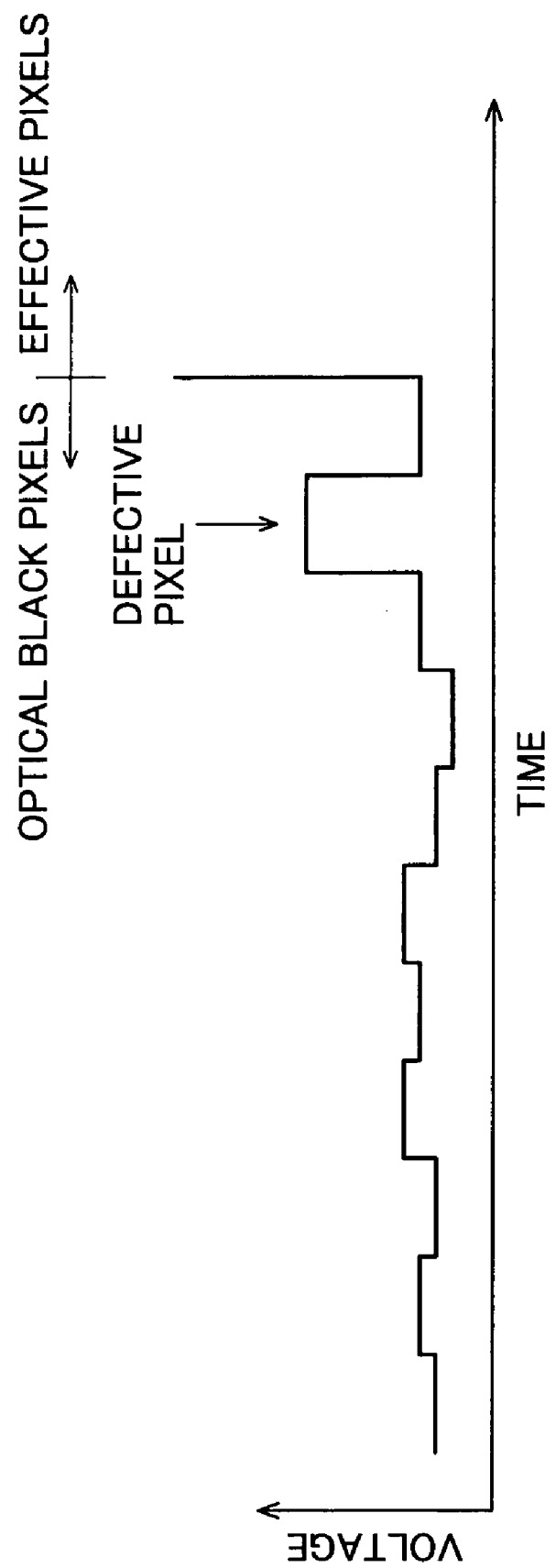
FIG. 19 is a graph showing an integrated dark current signal read out from a prior art optical black pixel region in a horizontal blanking period.

In a power control circuit 22C, a logic circuit 26 generates enable signals EN21 to EN23 shown in FIG. 18 according to the output bit Q0 of the counter 23 and timing correction signals from the timing control circuit 20. The rising and falling edges of the enable signals EN21 to EN23 are deviated a little from one another.

The other constituents are the same as that of FIG. 11.

Description of operation of the above-described configuration is omitted since it is apparent from the description of the seventh embodiment and FIG. 18.

According to this tenth embodiment, since a sudden change in current is reduced due to the deviations of the rising and falling edges of the enable signals EN21 to EN23, variations in the power source voltage are smaller than in the seventh embodiment.

Although preferred embodiments of the present invention has been described, it is to be understood that the invention is not limited thereto and that various changes and modifications may be made without departing from the spirit and scope of the invention.

For example, in the first to tenth embodiments, the image sensor may be of a one-dimensional type.

In the seventh embodiment, the power-off period may be two vertical scanning periods or longer if further reduced frame rate is no problem.

Further, the A/D converter circuit 19 may be not constituent of the image sensor. In stead of the amplifier circuit 17 connected to the horizontal bus 16, amplifier circuits connected to respective vertical bus lines may be employed. The image sensor is not limited to be of a MOS type but may be of such a CCD type.

What is claimed is:

1. An image sensor comprising:

a pixel array, comprising at least one row of pixels, each pixel having a light receiving element and a reset switch connected to a reset node of said light receiving element, divided into an effective pixel region and an optical black pixel region; and a read-out circuit, scanning on said pixel array to read out signals from said pixels, including a black clamp circuit for holding a signal from said optical black pixel region as an integrated dark current signal and for correcting a signal from said effective pixel region with said integrated dark current signal, wherein said optical black pixel region comprises a potential averaging wiring directly connected to said reset nodes of a plurality of pixels in a pixel row.

2. The image sensor of claim 1, wherein pixels including said potential averaging wiring are located outside of said effective pixel region in a horizontal scanning direction, and line clamp is performed by said black clamp circuit.

* * * * *